United States Patent Office 3,293,209
Patented Dec. 20, 1966

3,293,209
LOW PRESSURE POLYMERS STABILIZED BY DIETHERS OF DIMERCAPTANS
Francis P. Baldwin, Summit, Robert I. McDougall, Newark, Clifford W. Muessig, Roselle, and Jeffrey H. Bartlett, New Providence, N.J., assignors to Esso Research and Engineering Company, a corporation of Delaware
No Drawing. Filed Apr. 4, 1961, Ser. No. 100,501
6 Claims. (Cl. 260—45.95)

This invention relates to an improved method of stabilizing low pressure solid alpha olefin hydrocarbon polymers against process and oxidative degradation. More particularly, it relates to chemicals which are believed to be novel, diethers of dimercaptans, which in combination with phenolic antioxidants, stabilize the polymers against process and oxidative degradation.

In the recent past, so-called "low pressure" solid, poly alpha olefin polymers have been attracting increasing attention as plastic materials. These polymers have been prepared by the now well-known process of polymerizing the monomer with catalyst systems made up of a partially reduced, reducible, heavy transition metal halide and a reducing, metal-containing compound to high density, isotactic, high molecular weight, solid, relatively linear products.

One of the drawbacks of the low pressure polymers has been the difficulty of stabilizing these materials against process and particularly oxidative degradation. The former connotes the degradation primarily due to heating and to shear with only limited amounts of air. The latter connotes degradation by aging in the presence of oxygen at elevated temperatures.

Many conventional additives for these problems have been found to be of limited effectiveness in these specific polymers. Additionally, the utilization of multiple additives has quite often resulted in an inhibiting rather than an enhancing effect of one on the other.

It has now been found that diethers of dimercaptans in combination with phenolic antioxidants stabilize these polymers against process and oxidative degradation. The ratio of phenolic compound to dimercaptan may vary within the amounts given below but a particularly suitable ratio is 1 part by weight of phenolic compound to about 5 parts by weight of dimercaptan.

The diethers of dimercaptans utilized correspond to the general formula RSR'SR wherein R is an alkyl group containing 12 to 20 carbon atoms and R' is selected from the groups consisting of aralkylene, alicyclic, and alkylene alicyclic radicals. Preferably the R' has a total of 1 to 10 carbon atoms. These chemicals permit of a variety of names depending upon the nomenclature used and it is to be understood that the latter, as employed herein, refers to the formula indicated. Especially effective examples of these types of materials are bis(tetradecyl mercapto) p-hexahydroxylylene and bis(tetradecyl mercapto)p-xylylene. These materials are utilized in the polymer in a minor amount, i.e., an amount in the range of about 0.005 to 2 weight percent based on the polymer.

The diethers of the dimercaptans are prepared in general by reacting the sodium salt of the desired mercaptan with the appropriate dichloride. A suitable solvent (methyl alcohol+toluene) is used. NaCl precipitates out and is filtered. The product is recovered by stripping the solvent under vacuum and is purified by crystallizing from acetone or methyl alcohol-acetone combination.

While the compounds described directly above are themselves stabilizers, they are particularly effective with phenolic antioxidants with which they combine in a synergistic manner. Both monohydric and polyhydric phenols can be employed. Typical phenols thus include: 2,4,6-trimethyl phenol; 2,4,6-triisopropyl phenol; 2,4,6-triethyl phenol; 2,4,6-tri-tert. butyl phenol; 2,4,6-tri-tert. amyl phenol; 2-tert. butyl-4,6-dimethyl phenol; 2,6-diethyl-4-methyl phenol; 2,6-di-tert. butyl-4-methyl phenol; 2,6-dipropyl - 4-methyl phenol; 2,6-diethyl - 4-tert. butyl phenol; 2,6-di-tert. butyl-4-tert. amyl phenol; 2,6-dimethyl-4-dodecyl phenol; 2,6-di-tert. butyl-4-nonyl phenol; 2,2'-methylene bis(4-methyl-6-tert.-butyl phenol); 4,4'-methylene bis(2,6-di-tert.-butyl phenol); 4,4'-thiobis(2-methyl-6-tert.-butyl phenol); 2,2'-thiobis(4-methyl-6-tert.-butyl phenol); zinc dialkyl dithiocarbamates; trisphenol; condensation products of phenols and a cyclic terpene such as pinene; and 4,4'-thiobis(3-methyl-6-tert. butyl phenol). Particularly effective for this purpose are the last two materials and Bisphenol A and alkylation products thereof; 4,4'-butylidene bis(6-tert.-butyl-m-cresol); and 2,6-bis(2'-hydroxy-3'-tert.-butyl - 5'-methylbenzyl)-4-methyl phenol. The phenolic antioxidant is also utilized in a minor amount, i.e., an amount in the range of about 0.005 to 2 weight percent based on the polymer.

These materials can be incorporated by dry blending, milling and extruding into dry polymer powder, or during polymer processing.

For the purpose of convenience, details of the low pressure catalytic process and the products obtained thereby are presented below, although it should be realized that these by themselves constitute no part of this invention. The process is generally described in the literature, e.g., see "Scientific American," September 1957, pages 98 et seq.

In that process the polymers are prepared by polymerizing or copolymerizing the monomers with the aid of certain polymerization catalysts. The catalysts are solid, insoluble reaction products obtained by partially reducing a heavy metal compound usually the halide of a Group IV–B, V–B and VI–B metal of the Periodic System, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details see copending U.S. application Serial No. 578,198, now Patent No. 3,128,252, filed April 6, 1956 and Serial No. 766,376, now Patent No. 3,032,513, filed October 19, 1958.) The product is then activated with an aluminum alkyl compound corresponding to the formula RR'ALX. In this formula, R, R' and X preferably are alkyl groups of 2 to 8 carbon atoms, although X may alternatively be hydrogen or halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid and the polymer product concentration in the polymerization zone is preferably kept between about 2 to 15% based on total contents so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent for deashing such as acetylacetone, is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The alpha olefinic feeds utilized in homo and copolymerization to solid polymers include ethylene, propylene, butene-1, heptene-1, dodecene-1, etc., with ethylene and propylene preferred.

The polymers produced have molecular weights in the range of about 50,000 to 300,000 or even as high as 3,000,000 as determined by the intrinsic viscosity method using the correlation of Chiang (J. Polymer Science, 28, 235, 1958). The polymers have a high degree of crystallinity and a low solubility in n-heptane.

It is to be understood that the term "low pressure" polymer as used herein connotes material prepared in the indicated manner.

This invention and its advantages will be better understood by reference to the following examples.

EXAMPLE 1

*Preparation of bis(tetradecyl mercapto)p-hexahydroxylylene*

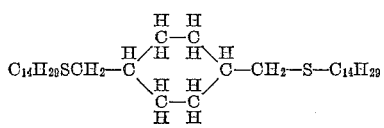

0.50 mole (115 grams) $C_{14}$ mercaptan ($C_{14}H_{29}SH$) was added to 300 cc. of toluene to which 0.50 mole (27 grams) sodium methylate was also added. The system was heated to 90° C. for about ½ hour. 0.25 mole (67 grams) α-α'-dibromo hexahydro-p-xylene was then added through a dropping funnel and heated for 2 hours. The system was then cooled, water washed, and dried with sodium sulphate. The solvent was removed under vacuum. The product was crystallized from acetone and dried in a vacuum oven at 50° C. A yield of 109 grams was obtained.

EXAMPLE 2

*Preparation of bis(tetradecyl mercapto)p-xylylene*

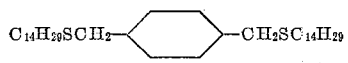

0.5 mole (115 grams) $C_{14}$ mercaptan ($C_{14}H_{29}SH$) and 0.5 mole (27 grams) sodium methylate were added to 300 cc. of toluene and the system heated to about 90° C. for about ½ hour. 0.25 mole (44 grams) α-α'-dichloro-p-xylene in 200 cc. of toluene was added through a dropping funnel and the system heated for 2 hours thereafter. After cooling it was washed with water and dried. The solvent was removed under vacuum and the product crystallized from acetone. It was then dried in a vacuum oven at 50° C. giving a yield of 121 grams and a product having a melting point of 68° to 69° C.

EXAMPLE 3

Bis(tetradecyl mercapto)p - hexahydroxylylene was tested for stabilizing various formulations of identical uninhibited low pressure polypropylene prepared by using an aluminum triethyl activated aluminum-reduced $TiCl_4$ catalyst. The details and results were as follows:

| P.p.h. in Polypropylene | Extended Melt Index at 300° C. | | Oven Aging at 300° F. (35 mils), Days to degrade |
|---|---|---|---|
| | 6'-9' | Ratio 27'-30'/6'-9' | Initial-Complete |
| 0.1 4,4'-thiobis(3-methyl-6-tert. butyl phenol) | 0.49 | 13.9 | 4-6 |
| 0.1 4,4'-thiobis (3-methyl-6-tert. butyl phenol) plus 0.5 bis(tetradecyl mercapto) p-hexahydroxylylene | 0.42 | 13.6 | 28-54 |

The results of the extended melt index test (ratio) indicate that good processing stability is retained while considerable improvements in oven aging (oxidative stability) results from use of the composition.

EXAMPLE 4

Bis(tetradecyl mercapto)p-xylylene was tested for stabilizing various formulations of identical uninhibited low pressure polypropylene prepared by using an aluminum triethyl activated aluminum-reduced $TiCl_4$ catalyst. The details and results were as follows:

| Inhibitor, P.p.h. in Polypropylene | Extended Melt Index at 250° C. | | Oven Aging at 300° F. (75 mils), Days to degrade |
|---|---|---|---|
| | 6'-9' | Ratio 18'-21'/6'-9' | Initial-Complete |
| 0.1 4,4'-thiobis (3-methyl-6-tert. butyl phenol) | 2.7 | [1] >1.4 | 4-7 |
| 0.1 Bis(tetradecyl mercapto) p-xylylene | (²) | | <1-6 |
| 0.5 Bis(tetradecyl mercapto) p-xylylene | (²) | | 1-14 |
| 0.05 4,4'-thiobis(3-methyl-6-tert. butyl phenol plus 0.1 Bis(tetradecyl mercapto) p-xylylene | 1.8 | 1.4 | 15-20 |
| 0.1 4,4'-thiobis(3-methyl-6-tert. butyl phenol) plus 0.5 Bis(tetradecyl mercapto) p-xylylene | 2.1 | 1.5 | 26-46 |

[1] 15'-18'/6'-9'.   ² Too soft.

The results show that processing stability is considerably superior to bis(tetradecylmercapto) - p-xylylene and slightly better than that of the thiobisphenol alone. Hence processing stability is not harmed by addition of the diether but oxidative stability is greatly increased.

EXAMPLE 5

*Preparation of bis(hexadecyl mercapto) ethane*

.1 mole of hexadecyl mercaptan ($C_{16}H_{33}SH$) (26 grams) was added to 100 cc. toluene to which .1 mole of sodium methylate (5.5 grams) was added. The system was heated to about 90–100° C. for 1 hour. .05 ole of 1-2 dibromo ethane (8.7 grams) was added and the reaction mixture heated for 2 hours at reflux temperature. After cooling, the reaction mixture was water washed and mixed with sodium sulfate. The solvent was removed under vacuum and the product crystallized from acetone. It was dried in a vacuum oven at 40–50° C. Yield=14 grams.

*Analysis.*—Percent sulfur=11.82.   (theor.=11.84).

EXAMPLE 6

*Preparation of bis(hexadecyl mercapto) methane*

.1 mole of hexadecyl mercaptan ($C_{16}H_{33}SH$), 26 grams, was added to 100 cc. toluene to which .1 mole of sodium methylate (5.5 grams) was added. The system was heated to 90–100° C. for about 1 hour and .05 mole of dibromomethane was added (8 grams). The reaction mixture was heated for 2 hours at reflux temperature. After cooling, the solution was water washed and dried with sodium sulfate. The product was crystallized from acetone and dried in a vacuum oven at 40–50° C. Yield=11 grams.

*Analysis.*—Percent sulfur=12.09. (theor.=12.12).

EXAMPLE 7

*Preparation of bis(hexadecyl mercapto) propane*

.1 mole of hexadecyl mercaptan ($C_{16}H_{33}SH$), 26 grams, was added to 100 cc. of toluene to which .1 mole of sodium methylate (5.5 gs.) was added. The system was heated to about 90–100° C. for 1 hour. .05 mole of 1–3 dibromopropane (10 grams) was added and the reaction mixture was heated at reflux temperature for 2 hours. After cooling, the solution was washed with water, dried with sodium sulfate and the solvent removed under vacuum. The product was crystallized from acetone and dried in a vacuum oven at 40–50° C. Yield= 15 grams.

*Analysis.*—Percent sulfur=11.48. (theor. S=11.55%).

EXAMPLE 8

*Preparation of bis(tetradecyl mercapto) pentane*

.1 mole of tetradecyl mercaptan ($C_{14}H_{29}SH$), 23 grams, was added to 100 cc. of toluene to which was added .1 mole of sodium methylate (5.5 grams). The system was heated to about 90–100° C. for 1 hour and .05 mole of 1–5 dibromopentane (11.5 grams) was added. The reaction was heated at reflux temperature for 2 hours. After cooling, the solution was washed with water, and the solvent removed with vacuum. The product was crystallized from acetone. Yield=14 grams.

*Analysis.*—Percent sulfur=11.86. (theor.=12.12).

EXAMPLE 9

*Preparation of bis(octadecyl mercapto) butane*

.1 mole of octadecyl mercaptan ($C_{18}H_{37}SH$), 29 grams, was added to 100 cc. of toluene to which was added .1 mole of sodium methylate (5.5 g.). The system was heated to 90–100° C. for about 1 hour. .05 mole of 1–4 dibromobutane (11 grams) was added and the reaction mixture heated at reflux temperature for about 2 hours. After cooling, the solution was washed with water and the solvent removed under vacuum. The product was crystallized from acetone. Yield=11 grams.

Percent sulfur=10.36. (theor. S=10.22%).

EXAMPLE 10

*Preparation of adduct of cyclododecatriene and β-mercaptopropionic acid*

A 300 ml. Erlenmeyer flask was charged with:

| | Grams |
|---|---|
| Cis,trans,trans-1,5,9-cyclododecatriene (0.16 m.) | 26.0 |
| β-Mercaptopropionic acid (0.48 m.) | 51.0 |
| Acetophenone | 0.5 |

This mixture was exposed to ultra-violet light for 2 hours from a Long Wave Ultra-Violet Model SL–3660 manufactured by Ultra-Violet Products, Inc. The mixture was then placed on a steam bath for 18 hours where it was maintained at 85° C. It was then allowed to stand at room temperature for 24 days after which it was stripped in a short path still at 0.1 mm. pressure to a pot temperature of 100° C. The residue of 32 g. had a sulfur content of 16.3%. This corresponds to an adduct containing mostly 2 moles of mercaptopropionic acid (theoretical for 2 m.=17.1% sulfur.)

The above compound was esterified with dodecanol by the usual esterification technique using toluene to azeotrope the water and p-toluene sulfonic acid as a catalyst. The ester was recovered by stripping off the solvent and low boiling products under vacuum. The ester residue was used in conjunction with Santanox as a heat stabilizer for polypropylene.

See data in Example 13.

EXAMPLE 11

*Preparation of adduct of cyclododecatriene and mercaptoacetic acid*

A 500 ml. Erlenmeyer flask was charged with:

| | Grams |
|---|---|
| Cis,trans,trans-1,5,9-cyclododecatriene (0.6 m.) | 97.2 |
| Mercaptoacetic acid (1.8 m.) | 165.6 |
| Acetophenone | 2.5 |

The above mixture was exposed to ultra-violet light as in the case of the β-mercaptopropionic acid. It was also maintained at 85° C. on a steam bath for 18 hours and then allowed to stand at room temperature for 24 days. On stripping in a short path still at 0.1 mm. to a pot temperature of 100° C. there was obtained a residue of 188 g. Sulfur analysis of the residue showed 21.67% sulfur which is equivalent to being mostly an adduct of 3 moles of mercaptoacetic acid (theoretical= 21.9% sulfur).

The above compound was esterified with dodecanol by the usual esterification technique using toluene to azeotrope the water and p-toluene sulfonic acid as a catalyst. The ester was recovered by stripping off the solvent and low boiling products under vacuum.

Similar tests were run as in Example 4. The summaries are presented below:

| P.p.h. in Polypropylene | Extended Melt Index at 250° C. | | Oven Aging at 300° F. (75 mils), Days to degrade |
|---|---|---|---|
| | 6'–9' | Ratio 18'–21'/6'–9' | Initial-Complete |
| 0.1 4,4'-thiobis(3-methyl-6-t-butyl-phenol) plus 0.5 bis-(alkylmercapto)-p-xylylene where alkyl is: | | | |
| Tetradecyl | 0.2 | 1.7 | 56–69 |
| Tridecyl (branched) | 0.5 | 1.7 | 49–59 |
| Octadecyl | 0.4 | 1.4 | 56–69 |

These results show that in the $C_{13}$–$C_{18}$ alkyl derivative range there was little difference as regards oxidative stability.

EXAMPLE 12

Similar tests were run as in Example 4. The summaries are presented below:

| P.p.h. in Polypropylene | Extended Melt Index at 300° C. | | Oven Aging at 300° F. (35 mils), Days to degrade |
|---|---|---|---|
| | 6'–9' | Ratio 27'–30'/6'–9' | Initial-Complete |
| 0.1 4,4'thiobis(3-methyl-6-t-butylphenol) | 0.5 | 14 | 3–6 |
| 0.1 4,4'thiobis(3-methyl-6-t-butylphenol) plus 0.5 bis-(tetradecyl-mercapto)-p-xylylene | 0.9 | [1] >6 | 43–54 |
| 0.1 2,6-bis(2'-hydroxyl-3'-t-butyl-5'-methyl-benzyl)-4-methylphenol | 0.4 | 6 | 6–9 |
| 0.1 2,6-bis(2'-hydroxyl-3'-t-butyl-5'-methyl-benzyl)-4-methylphenol plus 0.5 bis-(tetradecyl-mercapt )-p-xylylene | 0.6 | 7 | 27–33 |
| 0.1 4,4'-thiobis(3-methyl-6-t-butylphenol) plus 0.5 bis-(octadecylmercapto)-p-xylylene | 0.4 | 30 | 46–53 |
| 0.1 Agerite Superlite (R.T. Vanderbilt Co.) plus 0.5 bis(octadecyl-mercapto)-p-xylylene | 0.2 | 19 | 23–32 |
| 0.1 Agerite Superlite | 2.5 | [1] >2 | 1–5 |

[1] 21'–24'/6'–9'.

These results show the improvement in oxidative stability imparted by the components of this invention.

EXAMPLE 13

Similar tests were run as in Example 4. The summaries are presented below:

EXAMPLE 13

| P.p.h. in Polypropylene | Extended Melt Index at 300° C. | | Oven Aging at 300° F. (35 mils), Days to Degrade |
|---|---|---|---|
| | 6'–9' | 27'–30'/6'–9' | Initial–Complete |
| 0.5 di-octadecyl-1,5-pentane dithioether $C_{18}H_{37}S(CH_2)_5SC_{18}H_{37}$ | 17.3 | | <1–1 |
| 0.5 di-octadecyl-1,4-butane dithioether $C_{18}H_{37}S(CH_2)_4SC_{18}H_{37}$ | 11.7 | ¹ >2 | <1–4 |
| 0.5 di-hexadecyl-1,2-ethane dithioether $C_{16}H_{33}S(CH_2)_2SC_{16}H_{33}$ | 9.3 | ¹ >2 | 3–8 |
| 0.1 4,4'-thiobis(3-methyl-6-t-butylphenol) plus 0.5 of the following: Bis(octadecylmercapto)-p-xylylene $C_{18}H_{37}SCH_2\text{-}\langle\rangle\text{-}CH_2SC_{18}H_{37}$ | 0.4 | 30 | 46–53 |
| Di-tetradecyl-1,5-pentane dithioether $C_{14}H_{29}S(CH_2)_5SC_{14}H_{29}$ | 0.3 | 18 | 41–51 |
| Di-octadecyl-1,5-pentane dithioether $C_{18}H_{37}S(CH_2)_5SC_{18}H_{37}$ | 0.4 | 23 | 36–48 |
| Di-octadecyl-1,4-butane dithioether $C_{18}H_{37}S(CH_2)_4SC_{18}H_{37}$ | 0.8 | ² >13 | 26–32 |
| Di-hexadecyl-1,3-propane dithioether $C_{16}H_{33}S(CH_2)_3SC_{16}H_{33}$ | 0.3 | 17 | 41–49 |
| Di-hexadecyl-1,2-ethane diether $C_{16}H_{33}S(CH_2)_2SC_{16}H_{33}$ | 0.4 | 20 | 37–48 |
| Di-hexadecyl-methane dithioether $C_{16}H_{33}SCH_2SC_{16}H_{33}$ | 0.3 | 12 | 41–51 |

¹ 15'–18'/6'–9'.  ² 21'–24'/6'–9'.

These results show the efficacy of the compounds of this invention where R' is an alkylene radical.

EXAMPLE 14

Similar tests were run as in Example 4. The summaries are presented below:

| P.p.h. in Polypropylene | Extended Melt Index at 300° C. | | Oven Aging at 300° F. (35 mils), Days to degrade |
|---|---|---|---|
| | 6'–9' | Ratio 27'–30'/6'–9' | Initial–Complete |
| 0.1 4,4'-thiobis(3-methyl-6-t-butylphenol) plus 0.5 of poly(alkoxy carbonyl alkylthio) cyclododecanes: Didecylester of reaction product of cyclododecatriene and thioacetic acid | 0.8 | 23 | 15–19 |
| Didecylester of reaction product of cyclododecatriene and thiopropionic acid | 0.8 | 18 | 28–34 |

These data demonstrate the efficacy of the poly(alkoxy carbonyl alkyl thio) cyclodecanes.

When tested with linear polyethylene the materials of this invention give similar results.

Poly(alkoxy carbonyl alkyl thio) cyclododecanes have also been found to have utility in conjunction with phenolic antioxidants for stabilizing low pressure polymers.

The advantages of this invention will be apparent to those skilled in the art. Polymer stabilization is secured in an efficient and economical manner. The novel compounds or the synergistic combinations of this invention can be utilized in polymer formulations containing other stabilizers.

It is to be understood that this invention is not limited to the specific examples which have been offered merely as illustrations and that modifications may be made without departing from the spirit of the invention.

What is claimed is:
1. Novel chemical diethers of dimercaptans corresponding to the formula

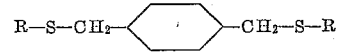

wherein R is an alkyl group containing 12 to 20 carbon atoms.

2. The compound of claim 1 wherein R is a tetradecyl group.

3. A composition of matter comprising a low pressure solid alpha ethylenically unsaturated olefin hydrocarbon polymer prepared by utilizing a partially reduced heavy transition metal halide catalyst, stabilized against process and oxidative degradation by .005 to 2 weight percent based on the polymer of each of both a phenolic antioxidant and the diethers of dimercaptans of claim 1.

4. The composition of claim 3 wherein the polymer is polypropylene.

5. The composition of claim 4 wherein the antioxidant is 4,4'-thiobis(3-methyl-6-tertiary butyl phenol).

6. The composition of claim 5 wherein the diether of a dimercaptan is the compound of claim 2.

References Cited by the Examiner

UNITED STATES PATENTS 2,490,875  12/1949  Landau et al. _____ 260–45.95
3,010,937  11/1961  Roos et al. _____ 260–45.95

OTHER REFERENCES

Jerchel et al., Chem. Ber., 87, 947–55 (1954).
Jones et al., Journal of the American Chemical Society, 60, 2452–6 (1938).
Wertheim, "Textbook of Organic Chemistry" 2nd Ed. Blakiston (Philadelphia), 1945, page 130.

LEON J. BERCOVITZ, *Primary Examiner.*

ARNOLD D. SULLIVAN, *Examiner.*

H. W. HAEUSSLER, H. E. TAYLOR,
*Assistant Examiners.*